United States Patent
Kemp et al.

(10) Patent No.: US 6,940,703 B1
(45) Date of Patent: Sep. 6, 2005

(54) OVERVOLTAGE PROTECTION CIRCUIT

(75) Inventors: Alson Kemp, Mountain View, CA (US); Marshall Chiu, Daly City, CA (US)

(73) Assignee: Tripath Technology, Inc., Santa Clara, CA (US)

( * ) Notice: Subject to any disclaimer, the term of this patent is extended or adjusted under 35 U.S.C. 154(b) by 75 days.

(21) Appl. No.: 09/738,267

(22) Filed: Dec. 15, 2000

Related U.S. Application Data

(60) Provisional application No. 60/170,963, filed on Dec. 15, 1999.

(51) Int. Cl.[7] .............................................. H02H 3/22
(52) U.S. Cl. ..................................... 361/91.1; 361/111
(58) Field of Search ................ 361/56, 111, 91.1–91.7, 361/100, 18, 90; 323/222–224, 269, 268

(56) References Cited

U.S. PATENT DOCUMENTS

| | | | | |
|---|---|---|---|---|
| 3,604,885 A | * | 9/1971 | Inoue ....................... 219/69.18 |
| 4,054,830 A | * | 10/1977 | Harrel ........................ 323/269 |
| 4,580,090 A | * | 4/1986 | Bailey et al. ................ 323/303 |
| 4,757,542 A | * | 7/1988 | Neahr et al. ................. 704/274 |
| 4,811,185 A | | 3/1989 | Cook et al. .................... 365/17 |
| 4,887,021 A | * | 12/1989 | Walker ........................ 323/279 |
| 5,025,203 A | * | 6/1991 | Edwards ...................... 323/268 |
| 5,117,198 A | | 5/1992 | Morenz ....................... 330/251 |
| 5,198,969 A | | 3/1993 | Redl et al. ..................... 363/17 |
| 5,334,928 A | * | 8/1994 | Dobkin et al. .............. 323/280 |
| 5,414,340 A | * | 5/1995 | Gannon ....................... 323/266 |
| 5,528,127 A | * | 6/1996 | Streit .......................... 323/269 |
| 5,581,626 A | * | 12/1996 | Palmer ........................ 381/103 |
| 5,629,608 A | * | 5/1997 | Budelman .................... 323/268 |
| 5,629,609 A | * | 5/1997 | Nguyen et al. ............. 323/269 |
| 5,721,483 A | * | 2/1998 | Kolluri et al. .............. 323/224 |
| 5,798,662 A | * | 8/1998 | Marosek et al. ............ 323/284 |
| 5,834,977 A | * | 11/1998 | Maehara et al. ............ 330/273 |
| 5,864,226 A | * | 1/1999 | Wang et al. ................. 323/273 |
| 5,929,615 A | * | 7/1999 | D'Angelo et al. .......... 323/222 |
| 5,929,617 A | * | 7/1999 | Brokaw ....................... 323/280 |
| 5,946,270 A | * | 8/1999 | Jang .......................... 361/91.2 |
| 6,101,111 A | * | 8/2000 | Blair ............................ 363/97 |
| 6,265,926 B1 | * | 7/2001 | Wong ........................... 326/81 |
| 6,271,712 B1 | * | 8/2001 | Ball ............................ 327/531 |

* cited by examiner

*Primary Examiner*—Stephen W. Jackson
*Assistant Examiner*—Danny Nguyen
(74) *Attorney, Agent, or Firm*—Beyer Weaver & Thomas, LLP

(57) ABSTRACT

An overvoltage protection circuit for interposing between an input voltage and a supply voltage is described. The overvoltage protection circuit includes switch circuitry connected to and passing current between an input voltage node and a supply voltage node, the input voltage node corresponding to the input voltage and the supply voltage node corresponding to the supply voltage. Switch control circuitry senses the supply voltage and regulates current flow through the switch circuitry in response thereto.

8 Claims, 2 Drawing Sheets

US 6,940,703 B1

OVERVOLTAGE PROTECTION CIRCUIT

RELATED APPLICATION DATA

The present application claims priority from U.S. Provisional Patent Application No. 60/170,963 for OVERVOLTAGE PROTECTION CIRCUIT filed on Dec. 15, 1999, the entirety of which is incorporated herein by reference for all purposes.

BACKGROUND OF THE INVENTION

The present invention relates to overvoltage protection in integrated circuits. More specifically, the present invention provides techniques for protecting integrated circuits from overvoltage conditions of relatively long duration with no significant loss of supply voltage.

Every integrated circuit (IC) is fabricated according to a process with a rated absolute maximum voltage. If any of the pins on an IC are subjected to a potential greater than this rated absolute maximum voltage, the device will be destroyed. Thus, the system designer must ensure that the IC is never subjected to a potential greater than the absolute maximum voltage in a given application. However there are situations where the overvoltage problem is unavoidable and some form of protection circuitry is needed in order to protect the IC.

One current solution involves the use of a zener diode tied between the IC's power pins and ground. When the system supply voltage (VIN) is less than the zener voltage, the zener diode remains off and current flows from VIN to the IC's supply voltage (VCC). The zener diode breaks down and conducts whenever VIN exceeds the set voltage for the particular zener diode. When the zener diode is conducting, excess current flows from VIN through the zener diode to ground, thereby holding VCC at the zener voltage.

The main problem with this solution is that the zener diode must pass large amounts of current and dissipate large amounts of heat. As a result, this solution is only acceptable if the over voltage condition is for a short period (e.g., less than 1 or 2 seconds). Otherwise the zener diode overheats, self destructs, and the IC loses its protection.

A voltage regulator is another potential solution for the overvoltage problem. Common voltage regulators such as the LM7812 can be used to limit the supply voltage at the IC. The main problem to this solution is "dropout voltage," i.e., the minimum difference between the regulator input voltage and the output voltage. The dropout voltage for a device such as the LM7812 is 1.5–2V. In an application such as automotive audio amplifiers, the supply should deliver the maximum available voltage up to, but not above, the rated IC voltage. Any dropout below the rated voltage is undesirable. So if the input is 14V and the rated voltage is 14V, then the regulator should deliver 14V. However, an LM7812, because of its dropout voltage, can only deliver 12.5V under these circumstances.

An additional problem with the voltage regulator solution is that the maximum output current may not be high enough to satisfy the system needs. For example, an LM340T-12 can source up to about 2.5 A, which only supplies about 30 W at 12V. This is an insufficient power level for applications such as an automotive audio amplifier.

It is therefore desirable to provide overvoltage protection for integrated circuits using techniques which can handle overvoltage conditions having relatively long durations, and which don't significantly reduce the maximum output power delivered by the circuits protected.

SUMMARY OF THE INVENTION

According to the present invention, IC overvoltage protection techniques are provided which are not characterized by the foregoing disadvantages. According to a specific embodiment, an overvoltage protection circuit is provided in series with the input voltage VIN and the IC supply voltage VCC which regulates the current between the two. That is, the circuit functions to reduce the current flow when VCC is too high, and to increase the current flow when VCC is too low. According to a more specific embodiment, the overvoltage protection circuit of the present invention uses a P-channel MOSFET to pass current between VIN and VCC, a voltage divider to sense and scale VCC, an inverting voltage-controlled current source, and a resistor to provide gate drive for the MOSFET. When VCC is low, the MOSFET is driven harder, allowing more current to flow between VIN and VCC. When VCC is high, the MOSFET is provided with less drive, allowing less current to flow between VIN and VCC.

The present invention, which provides protection circuitry to prevent overvoltage breakdown in integrated circuits, should be distinguished from a mere voltage regulator. Voltage regulators typically boost (i.e., increase) or buck (i.e., decrease) an input voltage and output a set constant voltage, and are, themselves, integrated circuits having their own breakdown voltages.

Thus, the present invention provides an overvoltage protection circuit for interposing between an input voltage and a supply voltage. The overvoltage protection circuit includes switch circuitry connected to and passing current between an input voltage node and a supply voltage node, the input voltage node corresponding to the input voltage and the supply voltage node corresponding to the supply voltage. Switch control circuitry senses the supply voltage and regulates current flow through the switch circuitry in response thereto.

A further understanding of the nature and advantages of the present invention may be realized by reference to the remaining portions of the specification and the drawings.

DETAILED DESCRIPTION OF SPECIFIC EMBODIMENTS

Figure 1:
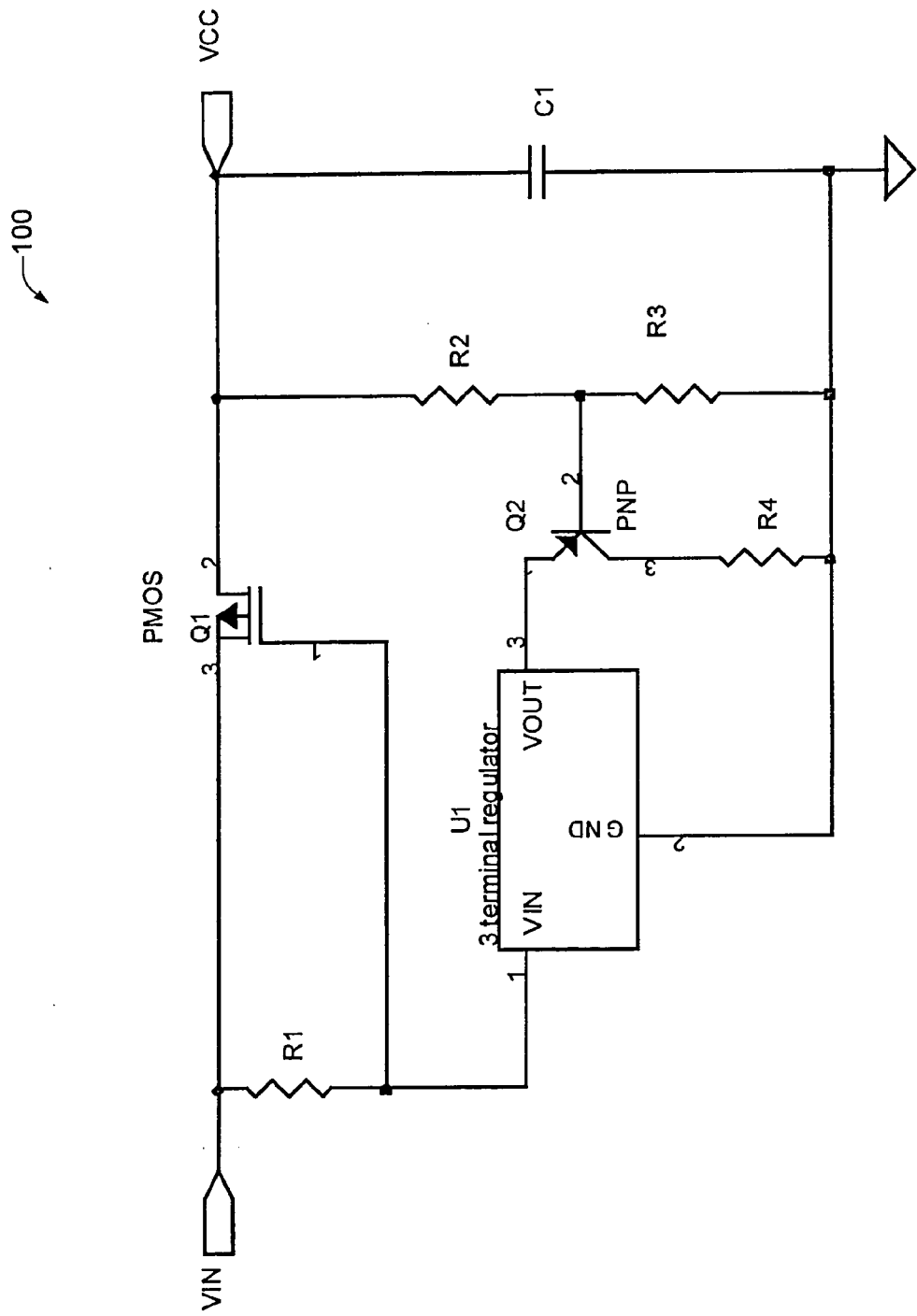
FIG. 1 is a simplified schematic of an overvoltage protection circuit designed according to a specific embodiment of the present invention.

FIG. 1 is a simplified schematic of an overvoltage protection circuit 100 designed according to a specific embodiment of the present invention. As mentioned above, circuit 100 functions to reduce the current flow between VIN and VCC when VCC is too high and increase the current flow between VIN and VCC when VCC is too low. To accomplish this, circuit 100 uses a P-channel MOSFET (Q1) to pass current from VIN to VCC, a voltage divider (comprising resistors R2 and R3) to sense and scale VCC, an inverting voltage-controlled current source (VCCS) (including Q2 and U1) and a resistor (R1) to provide gate drive for Q1.

The VCCS includes R2, R3, Q2, and U1. According to a specific embodiment, U1 is a three terminal bucking DC voltage regulator. For purposes of explanation, we will assume U1 is a +5V regulator. However, it will be understood that the regulation value of U1 may be a wide variety of values without departing from the scope of the present invention. According to this example, Pin3 of U1 is fixed at 5V whenever the voltage at Pin1 is 5V or greater. Whenever VCC increases or decreases, the voltage at the base of Q2 goes up and down proportionally.

When the base of Q2 is one diode drop or more below the emitter, Q2 pulls current from U1, and U1 pulls current across R1 and turns on Q1, thus allowing more current to flow from VIN to VCC. When VCC is "high," the base of Q2 is also high. This causes Q2 to draw less current from U1, which reduces the current/voltage across R1 and Q1 thereby allows less current to flow from VIN to VCC.

Resistors R2 and R3 form a voltage divider which sets the voltage at which VCC will be clamped. Larger values of R2 result in an increased VCC. Larger values of R3 result in a decreased VCC. This "set" clamping voltage is then compared to the "set" voltage of the regulator minus one diode drop for Q2. Where, for example, U1 is an LM7805, the regulator "set" voltage is 5V minus 0.6V for Q2 or 4.4V.

According to a specific embodiment, Q1 is a PMOS device in the common source configuration so that the gate is driven below VIN to turn Q1 on. According to other embodiments, an NMOS device may be used instead. However, the gate would have to be driven above VIN and this would make the circuit more difficult to implement.

C1 is a filter capacitor that rejects high frequency noise on VCC and helps with loop stability. R4 is not essential to the operation of the voltage clamp but provides a limit on the current that Q2 pulls from U1.

Figure 2:
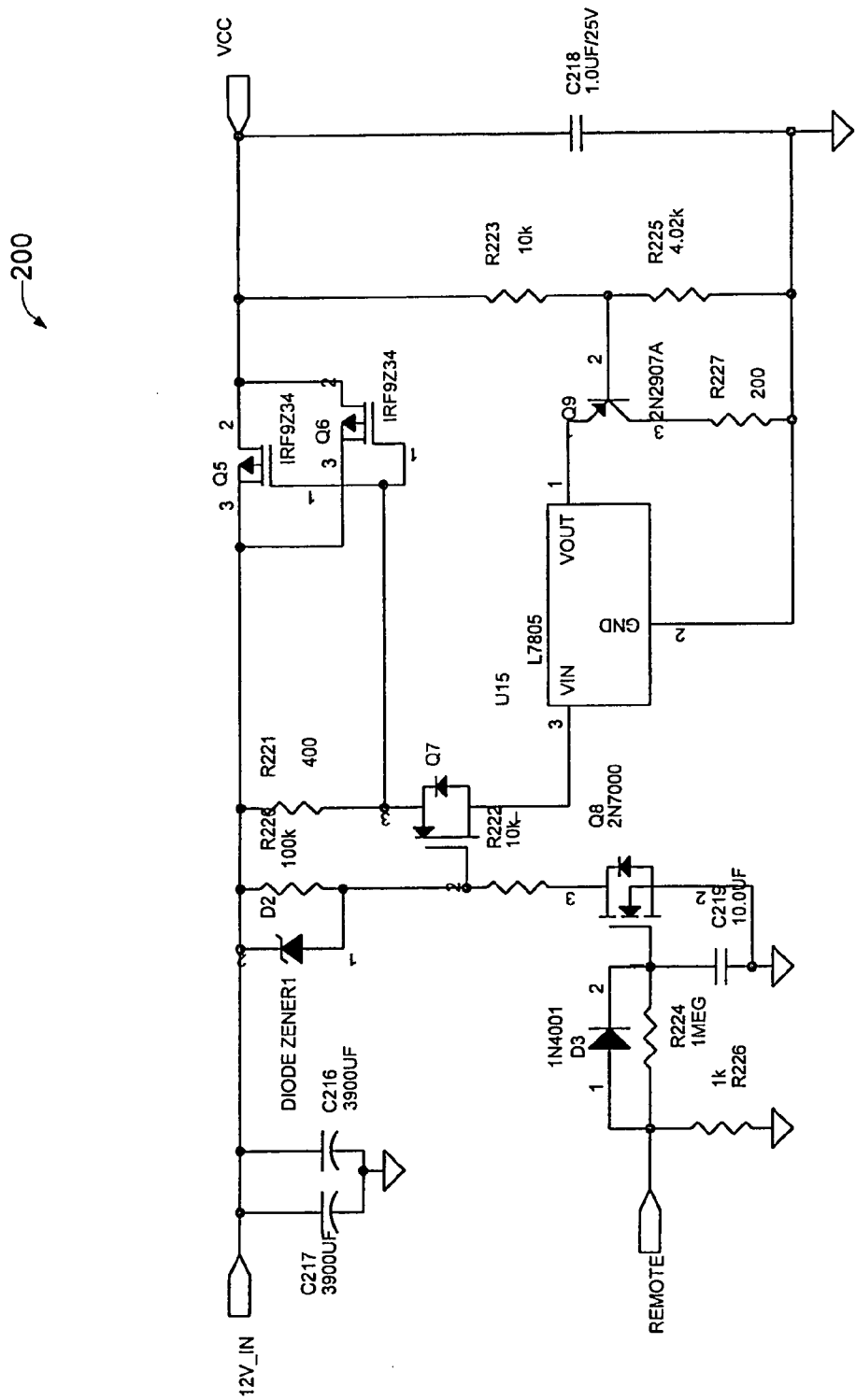
FIG. 2 is a more detailed schematic of an overvoltage protection circuit designed according to another specific embodiment of the present invention.

FIG. 2 is a more detailed schematic of an overvoltage protection circuit 200 designed according to another specific embodiment of the present invention. Circuit 200 operates substantially the same as described above with reference to circuit 100 of FIG. 1. Circuit 200 may be used, for example, to provide overvoltage protection in an automotive audio power amplifier system. In such an application, the car battery is connected to the 12V_IN input and VCC is connected to the power pins of the amplifier circuit. An LM7805 voltage regulator is used to generate the "set" voltage for the feedback divider. In this embodiment, the ratio of the values of resistors R223 and R225 set VCC to be clamped at 15V. It will be understood, however, that the ratio of these resistors may be varied to set the clamping voltage at any of a range of levels.

When the vehicle is running, 12V_IN is at 14.4V, which is a typical rated voltage for the system. When the car's engine is started the voltage seen at 12V_IN can be as high as 70V for a short period of time. Without adequate overvoltage protection, this 70V spike will likely destroy at least part of the amplifier circuit. A zener diode cannot be used in this application because it also would be destroyed. A regulator can be used here as described in the Background. However, because of the dropout voltage the audio power amplifier would be subject to an undesirable reduction in output power.

According to a specific embodiment and as shown in FIG. 2, two P-type power MOSFETs Q5 and Q6 (IRF9Z34s) are used in parallel to pass the current from 12V_IN to VCC. Configuring the MOSFETs in parallel reduces the conducting drain-to-source resistance ($R_{ds}$on) for the MOSFETs and significantly reduces the dropout voltage (i.e., by a factor of 2) compared to using a single MOSFET. This configuration also allows for shared power dissipation between the two MOSFETs. Thus, if 12V_IN is held at 70V for a long period of time the circuit would be able continue to protect the amplifier.

Transistors Q7 and Q8 are not part of the over voltage protection circuitry. Rather they serve to disable the overvoltage circuit when the vehicle's remote line is low. With these extra transistors the amplifier will be completely disconnected from the power supply when the remote line is low. The remote line is used to turn the audio power amplifier on and off.

While the invention has been particularly shown and described with reference to specific embodiments thereof, it will be understood by those skilled in the art that changes in the form and details of the disclosed embodiments may be made without departing from the spirit or scope of the invention. For example, an embodiment is described above in which the contemplated application for the present invention is providing overvoltage protection in an automotive audio power amplifier system. It will be understood, however, that the circuits and techniques described herein may be used to provide overvoltage protection in any integrated circuit application. Moreover, the present invention may be implemented using any of a wide variety of integrated circuit fabrication processes. Therefore, the scope of the invention should be determined with reference to the appended claims.

What is claimed is:

1. An amplifier, comprising:
   amplifier circuitry for amplifying an input signal; and
   overvoltage protection circuitry for interposing between an input voltage and an amplifier supply voltage, the amplifier supply voltage providing power to the amplifier circuitry, the overvoltage protection circuitry comprising;
   switch circuitry connected to and passing current between an input voltage node and an amplifier supply voltage node, the input voltage node corresponding to the input voltage and the amplifier supply voltage node corresponding to the amplifier supply voltage; and
   switch control circuitry for sensing the amplifier supply voltage and regulating current flow through the switch circuitry in response thereto, wherein the switch control circuitry comprises a three terminal bucking DC voltage regulator configured as a voltage controlled current source for providing a control signal to the switch circuitry;
   wherein an output of the voltage regulator is coupled to the supply voltage node such that a change in the supply voltage varies an output current from the voltage regulator, and thereby varies an input current to the voltage regulator from which the control signal is generated.

2. An automotive audio system, comprising:
   audio amplifier circuitry for amplifying an audio input signal; and
   overvoltage protection circuitry for interposing between a vehicle battery voltage and an amplifier supply voltage, the amplifier supply voltage providing power to the amplifier circuitry, the overvoltage protection circuitry comprising;
   switch circuitry connected to and passing current between vehicle battery voltage node and an amplifier supply voltage node, the vehicle battery voltage node corresponding to the vehicle battery voltage and the amplifier supply voltage node corresponding to the amplifier supply voltage; and switch control circuitry for sensing the amplifier supply voltage and regulating current flow through the switch circuitry in response thereto, wherein the switch control circuitry comprises a three terminal bucking DC voltage regulator configured as a voltage controlled current source for providing a control signal to the switch circuitry;

wherein an output of the voltage regulator is coupled to the supply voltage node such that a change in the supply voltage varies an output current from the voltage regulator, and thereby varies an input current to the voltage regulator from which the control signal is generated.

3. The amplifier of claim 1 wherein the switch circuitry comprises at least one transistor connected between the input voltage node and the amplifier supply voltage node.

4. The amplifier of claim 3 wherein the at least one transistor comprises at least one P-type MOSFET.

5. The amplifier of claim 3 wherein the at least one transistor comprises at least one N-type MOSFET.

6. The amplifier of claim 3 wherein the at least one transistor comprises a plurality of transistor configured in parallel.

7. The amplifier of claim 3 wherein the at least one transistor comprises a single transistor.

8. The amplifier of claim 1 wherein the switch control circuitry comprises a resistor divider for sensing the supply voltage.

* * * * *